Patented Feb. 24, 1931

1,793,983

UNITED STATES PATENT OFFICE

THEODORE WHITTELSEY, OF RINGOES, NEW JERSEY

COLLOIDAL EMULSION AND PROCESS

No Drawing.    Application filed November 6, 1922.   Serial No. 599,445.

This invention relates to fluid vehicles for organic colloids, such as rubber and the like, and certain applications of the same; to compositions or emulsions in which a non-aqueous solution of an organic colloid is one component and to certain applications of these compositions; and to certain processes.

One object of the invention is to produce a fluid vehicle for an organic colloid in which water is substituted in part for expensive solvents. Another object of my invention is to provide a convenient process for obtaining an organic colloid in a finely divided condition. Other objects of the invention will be apparent from the following specification.

My invention consists in certain compositions or emulsions, in certain applications of the same, and in certain processes, all of which will be fully set forth herein and particularly pointed out in the claims.

An essential element in the production of these compositions is an organic solid belonging to the class of organophil colloids, that is to say, of colloids capable of being dispersed by an organic liquid.

I have found that one of such substances, namely, rubber, is an efficient emulsifying agent. For example, if an ordinary rubber cement is intimately mixed with water, the mixture assumes a milk-white appearance and proves to be an emulsion in which droplets of water are suspended in the cement, i. e., the rubber has emulsified the water in the benzol, the latter forming the continuous phase.

One instance of such an emulsion is as follows:—When 100 volumes of a 5% rubber benzol cement is shaken with water, it will take up in the form of an emulsion from 40 to 50 volumes of water. A 10% rubber cement was found to take up 42% of water by shaking. The maximum rubber concentration of cement which can be emulsified easily with water by ordinary shaking is in the neighborhood of 10%. With more concentrated cement, and where an emulsion of dough-like consistency is desired, a method for incorporation of water may be used to advantage that brings the particles of the liquids into more intimate contact, as a rubber churn or other mechanical mixer.

In a mobile emulsion, as for instance, one made from a 5% rubber cement, on long standing the concentration of rubber in the lower part of the liquid will become greater than in the upper. This segregation of rubber may be prevented by transforming the emulsion into one of the opposite type in which droplets of cement are suspended in the water. This may be easily accomplished by the use of sodium oleate, gelatine, or any other emulsifying agent that will produce an emulsion in which water is the continuous phase. I have found that with benzol rubber cements, the most suitable amount of sodium oleate to use is in the neighborhood of ¼ of one per cent, figured on the water and with gelatine an approximately 1% solution. This gives a stable emulsion which, so far as my experience with it has yet gone, appears to be permanent. This type of emulsion has the further advantage in that it can be very largely diluted by mixing with sodium oleate water. Such a largely diluted emulsion is not permanent, but can be kept from depositing water by agitation. While I have above referred particularly to a cement consisting of rubber and benzol, I wish it understood that in place of benzol I may use any liquid in which rubber forms a colloidal solution. Such liquids may be volatile as naphtha, carbon disulphide or ether, or may be fixed solvents as oils of animal, vegetable or mineral nature, as fish oil, cottonseed oil or petroleum oils. Similarly I do not wish to confine myself to water as the second liquid member of my emulsion, but may use glycerine or any other liquid which is immiscible in bulk with the first liquid member under ordinary conditions.

When crude rubber is to be used in making an emulsion, it may be compounded on a mixing mill with the materials used in rubber-mixing, as zinc oxide, sulphur, accelerators, etc., and the addition of such ingredients does not interfere with the production of a satisfactory emulsion. The introduction of appropriate vulcanizing agents makes possible the vulcanization of the rubber of the emulsion in cases where this is desired.

The emulsions described may be used generally for the same purposes as ordinary rubber cements, either for an adhesive, as for instance in cementing one layer of material to another, or for a coating composition, as for instance when spread upon a fabric in the production of water-proof clothing, or for impregnation of more or less fibrous materials. After their application to materials, the liquid ingredients of the emulsions, if volatile, are removed either by spontaneous evaporation or by the aid of heat or vacuum. Where desirable the resulting vapors may be condensed and recovered in any appropriate manner. These emulsions are particularly useful where applied to absorbent materials such as paper, leather, fibers, fabrics, cords, etc. One of the advantages they possess over ordinary rubber cements is based on their application with satisfactory results to wet or damp materials. For example, in the manufacture of leather shoes certain parts are fastened together with rubber cement. In certain operations in the manufacture of a shoe, the leather is wet with water to form it to the last and when the rubber cement is applied, the leather is in a more or less damp condition. Whenever rubber cement is applied, the article is allowed to stand until the liquid portion of the cement has in great part evaporated before the two pieces of leather are brought together. The water in the leather is repellent to the cement liquid and only a surface layer of rubber is obtained in this way. On the contrary, wet leather is an absorbent for the liquid vehicle of my emulsion, so that when the latter is used, it is not necessary to expose the cemented surfaces before bringing them together, but the two pieces of leather may be applied to each other immediately and with pressure a satisfactory bond secured. For example, I have found that an 8% ordinary rubber cement will not give a satisfactory adhesion of two pieces of wet leather; while an emulsion of rubber cement and water in which the rubber content is 8% of the total emulsion gives a satisfactory bond.

While I have spoken above of making a rubber cement and subsequently mixing this with water to form an emulsion, I do not wish to limit myself as to this method. My emulsions may be formed by first swelling the rubber with water and then combining this with benzol, or by the simultaneous action of water and benzol on the rubber.

A very convenient method of preparing an emulsion by the simultaneous action of water and solvent on rubber consists in mixing rubber latex with a solvent for rubber or with a rubber cement. The proportions of the fluids and the concentration of the cement may be varied to produce emulsions of all consistencies from that of a stiff dough to a thin liquid. Compounding ingredients and vulcanizing agents may also be introduced when desired in emulsions made in this manner.

The introduction of sodium oleate or other emulsifying material may be by mixing with rubber latex, or when ordinary crude rubber is to be used in preparing the emulsion, by milling into the rubber, or by dissolving it in one of the liquids; in the water in the case of sodium oleate or the like, and in the benzol in the case of calcium oleate, or like substances, which being soluble in the benzol, intensify the emulsifying action of the rubber itself, which action is pointed out above. Where it is desired to use ordinary crude rubber to make an emulsion in which the rubber concentration is high, heat may be applied, as for example, by the use of a jacketed churn equipped with a reflux condenser, that is to say, with means whereby the vaporized liquid is condensed and allowed to return to the mixture. Emulsions of the consistency of dough may be made in this way.

In general these emulsions are the more satisfactory, the more finely divided is the disperse phase. I have found in the case of emulsions of the type where the benzol-rubber combination is the disperse phase, that the use of homogenizers is of advantage in securing droplets of uniform size and of exceeding great fineness. I have prepared homogenized emulsions in which over 95% of the droplets were less than one one-thousandth of a millimeter in diameter. I have secured this fineness for example by the use of a homogenizer of the type in which the emulsion is forced through small orifices under pressure; but I do not limit myself to the use of this particular type of homogenizer.

Emulsions in which the rubber-benzol combination is dispersed with this degree of fineness, are particularly well adapted for impregnating porous material as leather, and fibrous materials as threads, fabrics and cords, as in the manufacture of tires.

When ordinary rubber cement is applied to a material in which the pores or the interstices between fibers or threads are of capillary fineness, these materials act as a filter, only the solvent entering the minute openings, while the rubber remains on the surface. Such an ordinary cement is not a true solution but contains the rubber as a colloidal jelly disseminated through the liquid. Apparently the swollen rubber particles are too large to penetrate the interstices of the material. In my emulsions on the other hand I may obtain a dispersion of benzol-rubber droplets of less than 1/1000 of a millimeter in diameter, which penetrate the interstices between the fibers and produce a degree of impregnation that cannot be attained by ordinary rubber cements. This penetration is particularly of value in the case of the fabrics and cords used in the manufacture of tires where it is desirable to coat as completely as possible each individual fiber with rubber, to protect the fibrous elements from chafing upon each other.

In order to give a specific instance of my invention, I have referred particularly to rubber but the principle of my invention is applicable in general to organophil colloids, such as nitrocellulose, resins and the like. I have for example prepared emulsions by shaking a 3% amyl acetate solution of pyroxyline with water. The stability of the emulsion is improved when transformed into the type in which the solution is the disperse phase by the use of emulsifying agents such as sodium oleate, gelatine and the like. In the emulsions mentioned ¼ of 1% sodium oleate or 1% gelatine figured on the water proved satisfactory. It has been held hitherto that nitrocellulose films formed from solutions containing moisture were lacking in strength and that water in more than traces produced a precipitation of nitrocellulose in a white friable form practically worthless for technical uses. These difficulties are in a large part overcome when the nitrocellulose solution is used properly emulsified with water. I have obtained from an emulsion made by shaking one hundred volumes of a 3% solution of pyroxyline in amyl acetate with twenty-five volumes of water containing ¼ of 1% sodium oleate, a film in which there was no marked decrease in strength and but slight diminution in transparency as compared with films from a 3% amyl acetate solution. In the manufacture of nitrocellulose solutions, notwithstanding the constant search that has been made for solvents to replace the expensive amyl acetate, large amounts of amyl acetate are still consumed by the industry, and a decreased cost is attained by using non-solvents such as benzol to extend the amyl acetate solutions. It is obvious that an emulsion in which water is used to extend a nitrocellulose solution is a distinct advance in the art.

In the manufacture of rubber articles from my emulsions, the process includes the distribution of the rubber as desired, as impregnating the fabric in making tires, spreading the emulsion on the surface of woven fabric in making certain articles, or in otherwise shaping or distributing the emulsion as required; removing the volatile ingredients; and, if required, vulcanizing the rubber. These steps may be performed in substantially the same manner as with rubber cement.

In the claims the words "solution", "solvent", and "dissolving" are employed to include colloidal solutions, etc. as well as true solutions, etc. I employ the word "rubber" in the claims in the manner in which it is used in the art to include caoutchouc and exclude gutta percha.

In using the term "rubber solution" in the following claims I do so with its broad and usual sense in mind, i. e., a fluid more or less viscous containing the rubber distributed throughout a body of organic solvent; and I make no attempt to settle the disputed question whether the rubber is in true solution, colloidal dispersion or still a reticulated structure merely swollen by the solvent. The word "emulsion", however, I have used in the strict sense to refer only to colloidal dispersions in which the disperse phase consists of droplets of a liquid and the continuous phase is a liquid immiscible therewith.

Having thus described my invention, what I claim and desire to secure by Letters Patent, is:—

1. A rubber cement being an emulsion comprising droplets of a solution of unvulcanized rubber in an organic solvent immiscible with water colloidally dispersed in an aqueous solution of an emulsifying agent, said emulsion being homogenized.

2. A rubber cement being an emulsion comprising as one phase a solution of unvulcanized rubber in an organic solvent immiscible with water, as the other phase an aqueous liquid, and in one of said phases an emulsifying agent adapted to stabilize the emulsion.

3. The process for forming colloidal dispersions of rubber in a non-solvent liquid which comprises dissolving the rubber in a suitable solvent, emulsifying in the resulting solution a non-solvent liquid immiscible therewith, and adding thereto a stabilizing agent adapted to invert the emulsion and stabilize it in its inverted condition.

4. The process for forming colloidal dispersions of rubber in a non-solvent liquid which comprises dissolving the rubber in a suitable solvent, emulsifying in the resulting solution a non-solvent liquid immiscible therewith, and adding thereto a stabilizing agent adapted to invert the emulsion and stabilize it in its inverted condition, the emulsion both in its original and inverted condition being maintained under conditions adapted to avoid excessive evaporation of either liquid.

5. The method of diluting a viscous solution of an organophil colloid in an organic solvent without destroying its viscosity which comprises gradually mixing into the solution an amount of water less than half that of the original solution whereby the water is emulsified in the organic solvent.

6. The method of diluting a rubber cement consisting of rubber and an organic solvent without destroying its viscosity which comprises gradually mixing into the cement an amount of water less than half that of the original solution whereby the water is emulsified in the organic solvent.

7. The process of forming rubber cements containing unvulcanized rubber and a non-solvent liquid which comprises dissolving the rubber in a suitable solvent emulsifying the resulting solution with a non solvent liquid immiscible therewith and homogenizing the resulting emulsion.

8. A rubber cement being an emulsion comprising a solution of unvulcanized rubber in a suitable organic solvent, an aqeuous liquid, and an emulsifying and stabilizing agent, said emulsion being homogenized.

9. An emulsified rubber cement, one phase of which consists of a solution of rubber in a volatile solvent and the other phase of which consists of a liquid containing besides the rubber solution no more than a small quantity of an emulsifying agent.

10. A rubber cement having as its essential ingredients rubber latex, a rubber solvent and a small amount of an emulsifying agent.

11. The method of diluting a rubber cement consisting of rubber and an organic solvent which comprises gradually mixing into the cement an amount of water less than half that of the original solution and a stabilizing agent which is more soluble in the organic solvent than in water.

12. The method of diluting a rubber cement consisting of rubber and an organic solvent which comprises gradually mixing into the cement an amount of water less than half that of the original solution and a stabilizing agent that is more soluble in water than in the organic solvent.

13. A rubber cement being an emulsion comprising unvulcanized rubber, a rubber solvent, an emulsifying agent and water in an amount less than half that of the solvent.

14. A viscous rubber cement being an emulsion comprising unvulcanized rubber, a rubber solvent, water in an amount less than half the amount of solvent and an emulsifying agent that is more soluble in water than in the solvent.

15. A viscous rubber cement being an emulsion comprising unvulcanized rubber, a rubber solvent, water in an amount less than half the amount of solvent and an emulsifying agent that is more soluble in the solvent than in water.

16. A rubber cement being an emulsion of dough-like consistency comprising unvulcanized rubber, a rubber solvent, water and an emulsifying agent.

17. A viscous rubber cement being an emulsion of dough-like consistency comprising unvulcanized rubber, a rubber solvent, water and an emulsifying agent that is more soluble in water than in the solvent.

18. A viscous rubber cement being an emulsion of dough-like consistency comprising unvulcanized rubber, a rubber solvent, water and an emulsifying agent that is more soluble in the solvent than in water.

19. A viscous rubber cement being an emulsion comprising as the continuous phase a solution of unvulcanized rubber and an emulsifying agent in an organic solvent, and as the disperse phase an aqueous liquid.

20. A viscous rubber cement being an emulsion comprising as the continuous phase an aqueous solution containing a small quantity of an emulsifying agent, and as the disperse phase a solution of unvulcanized rubber in an organic solvent.

21. The process of forming a rubber cement which comprises intimately mixing rubber latex with a solvent for rubber in the presence of an emulsifying agent.

22. The process of forming a rubber cement which comprises intimately mixing unvulcanized rubber, water, an organic solvent for rubber and an emulsifying agent.

23. The process of forming a rubber cement which comprises causing water and an organic solvent to act simultaneously on unvulcanized rubber in the presence of an emulsifying agent.

24. The process of forming a rubber cement which comprises causing water and an organic solvent to act simultaneously on unvulcanized rubber in the presence of an emulsifying agent that is more soluble in the solvent than in the water.

25. The process of forming a rubber cement which comprises causing water and an organic solvent to act simultaneously on unvulcanized rubber in the presence of an emulsifying agent that is more soluble in water than in the solvent.

Signed at Flemington in the county of Hunterdon and State of New Jersey, this third day of November, 1922.

THEODORE WHITTELSEY.